United States Patent
Tanimoto

(10) Patent No.: US 9,292,237 B2
(45) Date of Patent: Mar. 22, 2016

(54) IMAGE FORMING APPARATUS

(75) Inventor: Satoshi Tanimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 173 days.

(21) Appl. No.: 13/073,650

(22) Filed: Mar. 28, 2011

(65) Prior Publication Data

US 2012/0081752 A1 Apr. 5, 2012

(30) Foreign Application Priority Data

Sep. 30, 2010 (JP) ................................ 2010-222897

(51) Int. Cl.
*G06K 15/00* (2006.01)
*G06F 3/12* (2006.01)
(Continued)

(52) U.S. Cl.
CPC .............. *G06F 3/1208* (2013.01); *G06F 3/122* (2013.01); *G06F 3/1235* (2013.01); *G06F 3/1267* (2013.01); *G06F 3/1279* (2013.01); *G06K 15/1886* (2013.01); *G06K 15/408* (2013.01); *H04N 1/32363* (2013.01); *H04N 1/32635* (2013.01); *H04N 1/32657* (2013.01); *H04N 1/32667* (2013.01); *H04N 1/32694* (2013.01); *G06F 3/121* (2013.01); *G06F 3/1263* (2013.01);
(Continued)

(58) Field of Classification Search
CPC .................. G06F 3/12; G06F 3/1204–3/1206; G06F 3/121; G06F 3/1219; G06F 3/1234; G06F 3/1239; G06F 3/1243; G06F 3/1253–3/1254; G06F 3/1273; G06F 3/1284–3/1285; G06F 3/1288; G06F 3/1208
See application file for complete search history.

(56) References Cited

U.S. PATENT DOCUMENTS 6,048,045 A * 4/2000 Nohata et al. ................ 347/7
2008/0060070 A1 * 3/2008 Uno .............................. 726/21

(Continued)

FOREIGN PATENT DOCUMENTS

JP 7-309049 11/1995
JP 11-341242 12/1999

(Continued)

OTHER PUBLICATIONS

Notice of Reasons for Rejection dated Sep. 18, 2012 received from the Japanese Patent Office from related Japanese Application No. 2010-222897, together with an English-language translation.

(Continued)

*Primary Examiner* — Tammy Pham
*Assistant Examiner* — Idowu O Osifade
(74) *Attorney, Agent, or Firm* — Scully, Scott, Murphy & Presser, PC

(57) ABSTRACT

An image forming apparatus is provided, including an image forming mechanism which executes a printing process; an object data memory which stores image data as an object of the printing process when a printing instruction is received; a re-formation condition memory which stores a type of a printing function and whether or not image data is an object of image re-formation in correlation with each other; an object judging mechanism which judges whether or not the image data as a source of the image formation is the object of the image re-formation; and a data deleting mechanism which deletes the image data as the source of the image formation from the object data memory if the image data as the source of the image formation is not the object of the image re-formation.

9 Claims, 11 Drawing Sheets

| | IMAGE DATA | NUMBER OF PRINTING SHEET(S) | GUARANTEE REGISTRATION | PRINTING TYPE (SUPPLY SOURCE) |
|---|---|---|---|---|
| R1 | 20100802_091200_01.tif | 3 | ABSENT | COPY |
| R2 | 20100802_091100_01.tif | 2 | PRESENT | FAX |
| R3 | 20100802_091000_01.tif | 3 | ABSENT | PC_PRINT/USB |
| R4 | 20100802_090900_01.tif | 5 | PRESENT | PC_PRINT/LAN |

| PRINTING TYPE (SUPPLY SOURCE) | GUARANTEE SETTING |
|---|---|
| FAX | ENABLED |
| COPY | DISABLED |
| MEDIA_PRINT | DISABLED |
| PC_PRINT/USB | DISABLED |
| PC_PRINT/LAN | ENABLED |
| MOBILE_PRINT | DISABLED |

(51) Int. Cl.
*G06K 15/02* (2006.01)
*H04N 1/32* (2006.01)

(52) U.S. Cl.
CPC *H04N 2201/0094* (2013.01); *H04N 2201/3202* (2013.01); *H04N 2201/3288* (2013.01); *H04N 2201/3295* (2013.01)

(56) References Cited

U.S. PATENT DOCUMENTS

| | | | |
|---|---|---|---|
| 2008/0180748 A1 | 7/2008 | Moriya | |
| 2008/0198413 A1* | 8/2008 | Hattori | 358/1.16 |
| 2008/0273887 A1* | 11/2008 | Kitami et al. | 399/38 |
| 2009/0033974 A1* | 2/2009 | Nishimi et al. | 358/1.14 |
| 2009/0033992 A1* | 2/2009 | Ogiwara et al. | 358/1.15 |
| 2009/0185204 A1* | 7/2009 | Wu et al. | 358/1.9 |
| 2010/0123726 A1* | 5/2010 | Ito | 345/501 |
| 2010/0195136 A1* | 8/2010 | Shudo | 358/1.14 |
| 2012/0033243 A1* | 2/2012 | Nakazato et al. | 358/1.13 |

FOREIGN PATENT DOCUMENTS

| | | |
|---|---|---|
| JP | 2000-57129 | 2/2000 |
| JP | 2003-103881 | 4/2003 |
| JP | 2007-233854 | 9/2007 |
| JP | 2008-179116 | 8/2008 |
| JP | 2008-201001 | 9/2008 |
| JP | 2008-287166 | 11/2008 |

OTHER PUBLICATIONS

Decision to Grant a Patent dated Dec. 4, 2012 received from the Japanese Patent Office from related Japanese Application No. 2010-222897, together with an English-language translation.

* cited by examiner

Fig. 2A

| IMAGE DATA | NUMBER OF PRINTING SHEET(S) | GUARANTEE REGISTRATION | PRINTING TYPE (SUPPLY SOURCE) |
|---|---|---|---|
| 20100802_091200_01.tif | 3 | ABSENT | COPY |
| 20100802_091100_01.tif | 2 | PRESENT | FAX |
| 20100802_091000_01.tif | 3 | ABSENT | PC_PRINT/USB |
| 20100802_090900_01.tif | 5 | PRESENT | PC_PRINT/LAN |

Fig. 2B

| PRINTING TYPE (SUPPLY SOURCE) | GUARANTEE SETTING |
|---|---|
| FAX | ENABLED |
| COPY | DISABLED |
| MEDIA_PRINT | DISABLED |
| PC_PRINT/USB | DISABLED |
| PC_PRINT/LAN | ENABLED |
| MOBILE_PRINT | DISABLED |

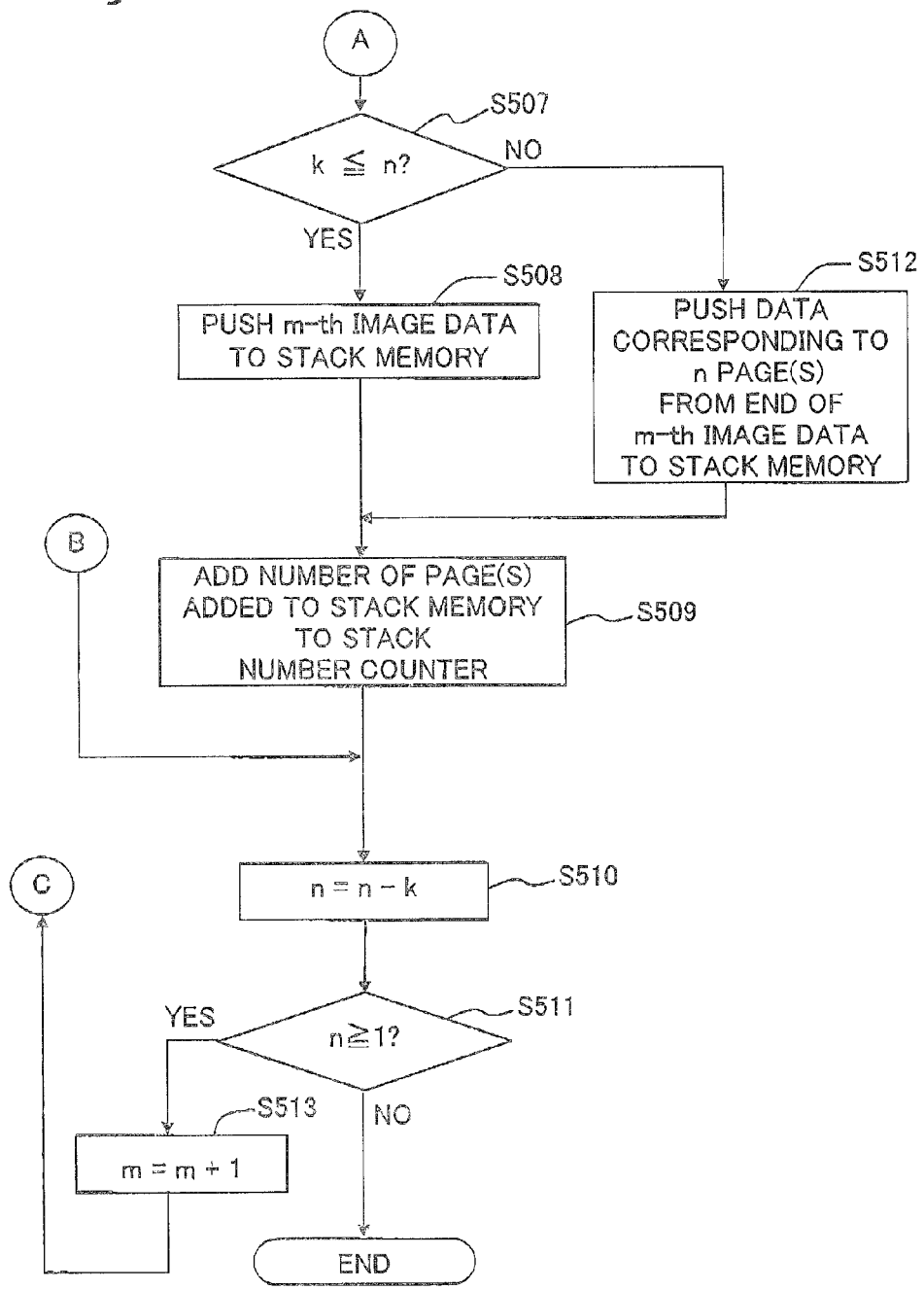

IMAGE FORMING APPARATUS

CROSS REFERENCE TO RELATED APPLICATION

The present application claims priority from Japanese Patent Application No. 2010-222897, filed on Sep. 30, 2010, the disclosure of which is incorporated herein by reference in its entirety.

BACKGROUND OF THE INVENTION

1. Field of the Invention

The present invention relates to an image forming apparatus.

2. Description of the Related Art

A recording product (recorded matter), which is unsatisfactory for a user, is sometimes obtained on account of the deterioration of a supply state of a coloring agent to be supplied to a recording medium during the image formation, in the case of an image forming apparatus in which an image is formed on the recording medium by using the coloring agent such as a toner, an ink or the like. For example, a recording product, which has my blur on a formed image, is sometimes obtained due to the shortage of the toner as the coloring agent. One of suggestions in relation to such an inconvenience is provided by a facsimile apparatus described in Japanese Patent Application Laid-open No. 11-341242. In this facsimile apparatus, the remaining amount of the toner is monitored by a sensor for detecting the toner amount. After a small-amount toner state, in which the remaining amount of the toner is small, is detected, the received facsimile data is stored in a memory. When the toner is exchanged, the facsimile data, which is approved as desired by the user, is selectively recorded as selected from the stored facsimile data.

However, in the case of the facsimile apparatus described in Japanese Patent Application Laid-open No. 11-341242, all of the image data (facsimile data) is stored in the memory after the toner remaining amount is in the small-amount toner state. Therefore, a problem arises such that the image data, which is unnecessary to be stored, is also stored, and the memory is consumed uselessly.

SUMMARY OF THE INVENTION

The present invention has been made in order to solve the problem as described above, an object of which is to provide an image forming apparatus which makes it possible to provide the guarantee for any insufficient image formation to a user, while suppressing the memory consumption amount.

According to an aspect of the present invention, there is provided an image forming apparatus which forms an image on a recording medium based on a received printing instruction, the image forming apparatus including:

an image forming mechanism which has at least one type of printing function and which executes a printing process for performing image formation on the recording medium based on a type of printing function, of the at least one type of printing function, that is designated by the printing instruction, under a condition that the printing instruction is received;

an object-data memory which stores an image data, that is an object of the printing process, under a condition that the printing instruction is received;

a re-formation condition memory which stores first information and second information with correlating the first information with the second information, the first information relating to the kind of the printing function and the second information relating to whether or not the image data stored in the object-data memory is an object of image re-formation;

an object-judging mechanism which judges whether or not the image data which is used in the image formation is the object of the image re-formation, based on the type of the printing function used to perform the image formation and a content stored in the re-formation condition memory, under a condition that the image formation is executed on the recording medium by the image forming mechanism; and a data deleting mechanism which deletes the image data which is used in the image formation from the object-data memory, under a condition that the object-judging mechanism judges that the image data which is used in the image formation is not the object of the image re-formation.

According to the image forming apparatus concerning the aspect of the present invention, it is judged whether or not the image data is the object of the image re-formation depending on the type of the printing function on the basis of the content of the re-formation condition memory. The image data, which is judged not to be the object of the image re-formation, is deleted from the object data memory. Therefore, it is possible to suppress the consumption amount of the memory required for the guarantee, while making it possible to provide the guarantee for the insufficient image formation to a user. The "printing function", which is referred to in the present teaching, is not limited to the representation of the classification of various functions to perform the printing (for example, the facsimile function, the copy function, and the printer function). It is intended that the "printing function" also includes the classification in which each of the functions is subdivided, for example, depending on the user as described later on.

The present invention can be constructed in various embodiments including, for example, a control unit for controlling the image forming apparatus, an image forming method, a control program for controlling the image forming apparatus, and a recording medium for recording the control program thereon.

BRIEF DESCRIPTION OF THE DRAWINGS

FIG. 2A schematically shows the contents stored in a log data memory, and FIG. 2B schematically shows the contents stored in a guarantee object table.

FIGS. 5A and 5B show flow charts illustrating a reprinting object data determining process.

DESCRIPTION OF THE PREFERRED EMBODIMENTS

Figure 1:
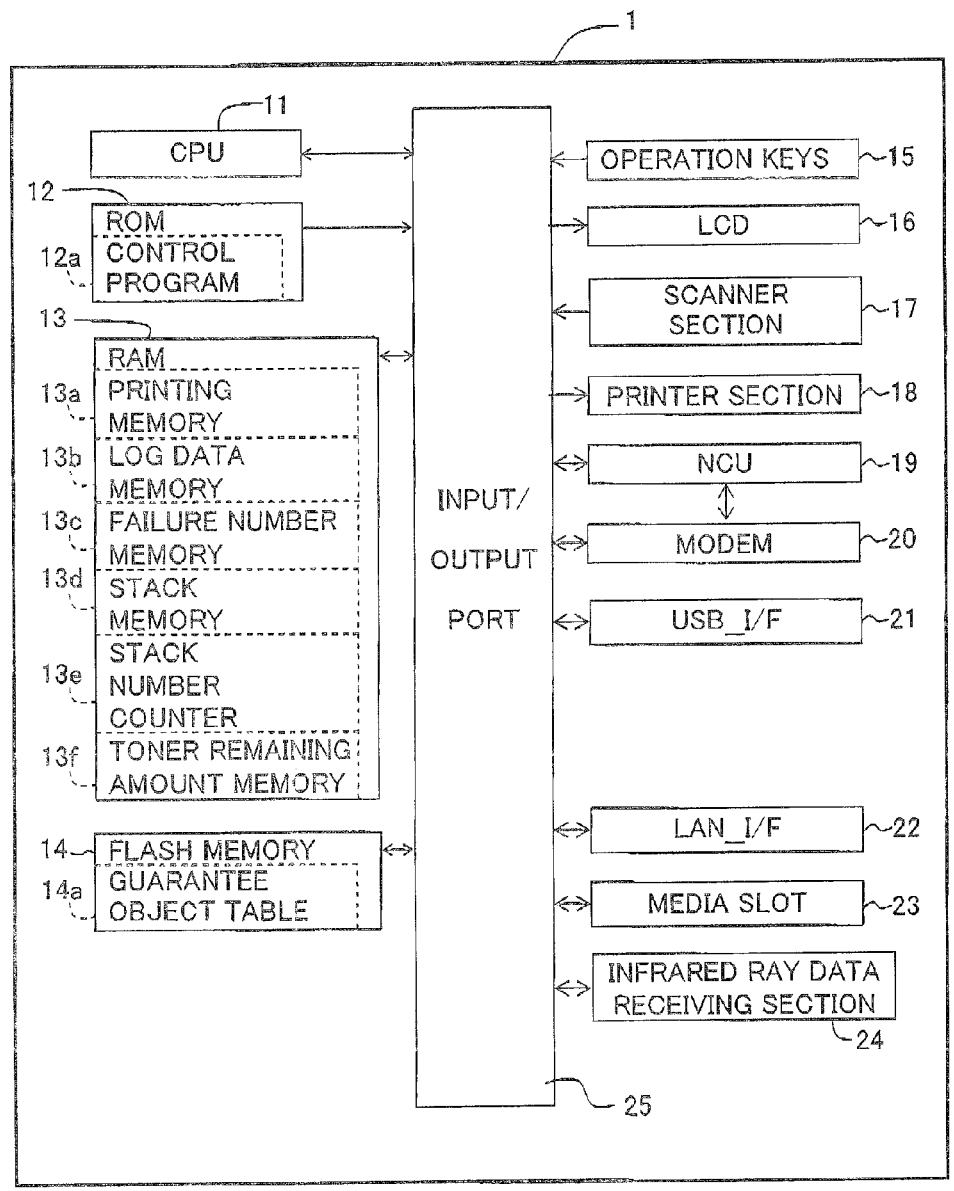
FIG. 1 shows a block diagram illustrating an electrical arrangement of a multifunction peripheral apparatus (machine) as an embodiment of the image forming apparatus according to the present invention.

A preferred embodiment of the present teaching will be explained below with reference to the accompanying drawings.

A multifunction peripheral (MFP) 1 has various functions including, for example, the printer function, the scanner function, the copy function, and the facsimile function (FAX). The MFP 1 is constructed such that the image data, which has been subjected to the printing, can be stored as the guarantee data in order to guarantee the failure in the printing (unsuccessful printing) caused, for example, by the shortage of the toner which is an expendable material, when the function, in which the printing is performed by a printer section 18, is used. In particular, the MFP 1 of this embodiment is constructed as follows. That is, the guarantee data is stored only when the data of a predetermined printing type based on the supply source of the image data is designated. Therefore, the memory consumption amount of RAM 13, which is required to store the guarantee data, can be suppressed.

The MFP 1 has a CPU 11, a ROM 12, a RAM 13, a flash memory 14, operation keys 15, an LCD 16, a scanner section 17, the printer section 18, an NCU 19, a modem 20, a USB interface (hereinafter referred to as "USB_I/F") 21, a LAN interface (hereinafter referred to as "LAN_I/F") 22, a media slot 23, and an infrared ray data receiving section 24. The constitutive elements or components as described above are connected to one another via an input/output port 25.

The CPU 11 controls the constitutive elements or components connected to the input/output port 25 in accordance with the fixed values and the programs stored, for example, in the ROM 12, various signals transmitted/received via NCU 19, and/or various signals transmitted/received via the constitutive elements or components 21 to 24. The ROM 12 is an unrewritable memory, which stores the control program 12a to be executed by the CPU 11. Programs of respective processes, which will be described later on with reference to FIGS. 3A to 5B, are composed of parts of the control program 12a.

The RAM 13 is a rewritable volatile memory, which has a printing memory 13a, a log data memory 13b, a failure number memory 13c, a stack memory 13d, a stack number counter 13e, a toner remaining amount memory 13f.

The printing memory 13a is a memory which stores the image data supplied from a predetermined supply source. In this embodiment, the printing memory 13a also functions as a memory in which the image data, which has been subjected to the printing, is stored as the guarantee data in order to guarantee the reprinting to be performed thereafter. The log data memory 13b is a memory which is provided to store the log data of the printing performed by the printer section 18. The arrangement of the log data memory 13b will be described later on with reference to FIG. 2A. The failure number memory 13c is a memory which is provided to store the number of failure sheet(s) inputted by a user when the toner is exchanged.

Figure 5A:
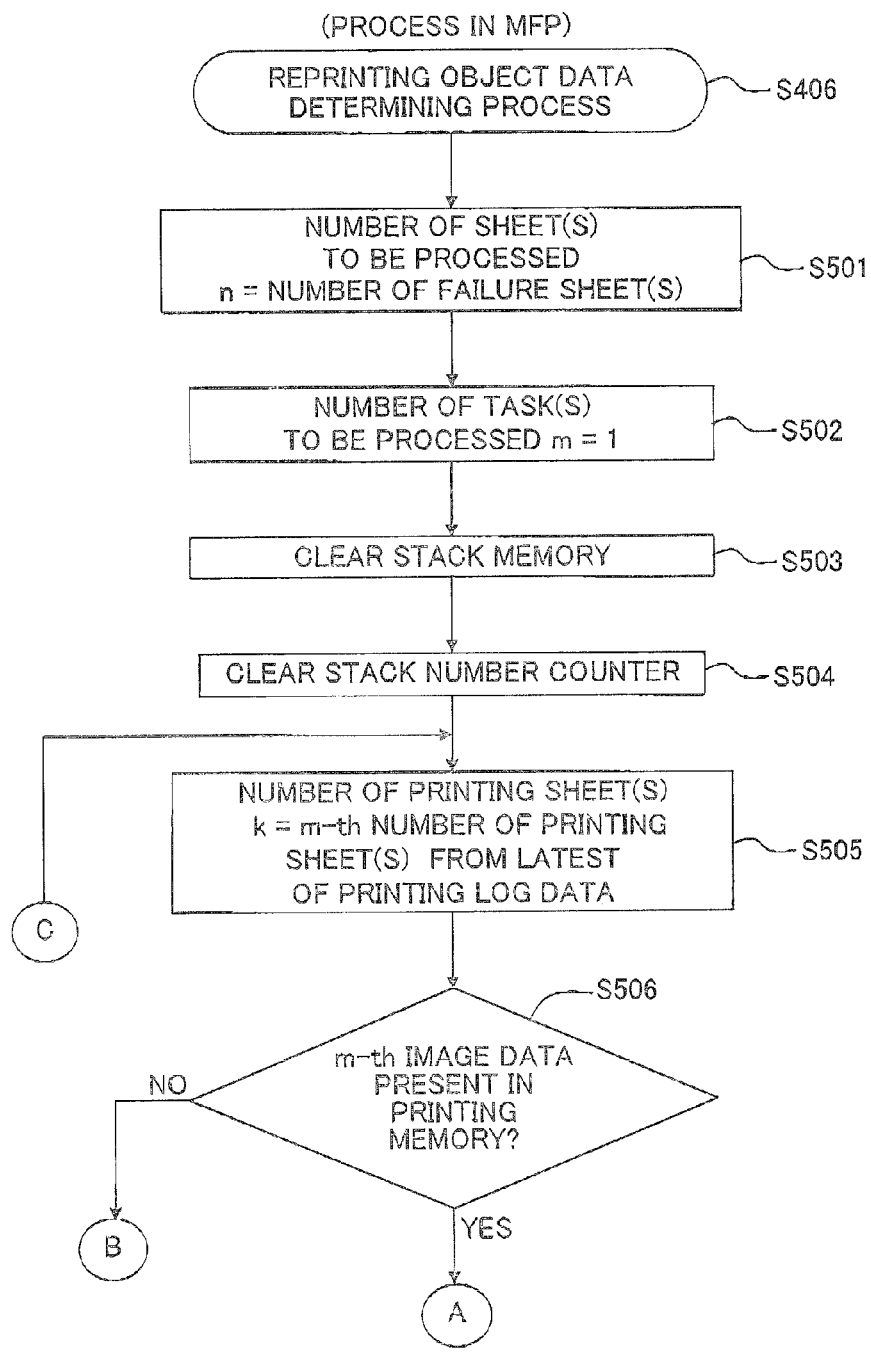

The stack memory 13d is a memory which stores the image data as the object of the reprinting that is selected from the image data stored in the printing memory 13a based on the number of failure sheet(s) inputted by the user in a reprinting object data determining process as described later on (see FIGS. 5A and 5B). The data can be taken out therefrom in an order starting from the data having been stored most newly, reversely to an order in which the pieces of image data have been stored. The stack number counter 13e is a counter in which the pieces of image data stored in the stack memory 13d are counted in a unit of the number of printing page(s) (i.e., the number of printing sheet(s)). The toner remaining amount memory 13f is a memory which is provided to store the toner remaining amount estimated from the toner consumption amount during the printing.

The flash memory 14 is a rewritable volatile memory, which stores the guarantee object table 14a. The guarantee object table 14a is a table which prescribes the condition under which the image data is allowed to remain as the guarantee data in the printing memory 13a after performing the printing. The arrangement of the guarantee object table 14a will be described later on with reference to FIG. 2B.

The operation keys 15 are hard keys which are provided to input the instruction to the MFP 1. The LCD 16 is a liquid crystal display device which displays various images and various screens including, for example, screens 601 to 604 (see FIGS. 6A and 6B) as described later on. An unillustrated touch panel is provided on the display surface of the LCD 16. The instruction to execute the process, which is allotted to each of the buttons, can be inputted into the MFP 1 by the user by touching the various buttons displayed on the LCD 16.

The scanner section 17 performs the reading operation in which a manuscript is read and converted into the electronic data during the execution of the facsimile function, the scanning function, or the copy function. The printer section 18 performs the printing operation in which the image is formed (printed) on the recording paper as the recording medium during the execution of the facsimile function or the printer function. The printer section 18 is constructed as a monochrome or black and white laser printer which uses the toner as the coloring agent in order to perform the recording on the recording paper.

The NCU 19 controls the telephone line. When the data is facsimile-transmitted, the modem 20 modulates the transmission signal into the form suitable for the transfer via the telephone line. On the other hand, when the data is facsimile-received, the modem 20 demodulates the modulated signal transmitted from the telephone line.

The USB_I/F 21 is an interface which is provided to connect the MFP 1 to an unillustrated personal computer (hereinafter referred to as "PC") via USB. The LAN_I/F 22 is an interface which is provided to connect the MFP 1 to an unillustrated LAN line. The media slot 23 resides in slots to which various media as small-sized external storage media (for example, an SD card (trade name)) are removably installable. The infrared ray data receiving section 24 is an interface which receives the data transmitted by using the infrared ray from a portable terminal (for example, a mobile phone) having the infrared ray communication function.

FIG. 2A schematically shows the contents stored in the log data memory 13b described above. The log data to be stored in the log data memory 13B is constructed by the image data 13b1, the number of printing sheet(s) 13b2, the guarantee registration 13b3, and the printing type (supply source) 13b4. In an example shown in FIG. 2A, four log data R1 to R4 are stored in the log data memory 13b.

The image data 13b1 is an area which stores the file name of the image data as the object of one time of the printing instruction in the printing memory 13a. The number of printing sheet(s) 13b2 is an area which stores the number of page(s) (i.e., the number of recording paper sheet(s)) subjected to the printing based on the image data having the file name stored in the image data 13b1.

The guarantee registration 13b3 is an area which stores the value to indicate whether or not the image data having the file name stored in the image data 13b1 is stored as the guarantee data in the printing memory 13a. In the example shown in FIG. 2A, the case, in which "present" is stated as the guarantee registration 13b3, indicates the fact that the value, which represents the storage of the corresponding image data as the guarantee data in the printing memory 13a, is stored. The case, in which "absent" is stated, indicates the fact that the value, which represents no storage (i.e., deletion) of the corresponding image data as the guarantee data in the printing memory 13a, is stored.

The printing type (supply source) 13b4 is an area which stores the printing type of the image data of each of the log data R1 to R4. The "printing type", which is referred to in this embodiment, intends that the printing type is the type corresponding to the supply source of the image data. The "printing type" corresponds to the "printing function" of the present teaching. In this embodiment, those set as the "printing type" are "COPY" which is the printing of the image data read by the scanner section 17, "FAX" which is the printing of the image data received from the external apparatus by means of the facsimile function, "MEDIA_PRINT" which is the printing of the image data stored in the media installed to the media slot 23, "PC_PRINT/USB" which is the printing of the image data received from a PC connected to the USB_I/F 21, "PC_PRINT/LAN" which is the printing of the image data received from a PC via the LAN line connected to the LAN_I/F 22, and "MOBILE_PRINT" which is the printing of the image data received from the portable terminal by means of the infrared ray communication by the aid of the infrared ray data receiving section 24.

FIG. 2B schematically shows the contents stored in the guarantee object table 14a described above. In the guarantee object table 14a, the guarantee setting 14a2 is allowed to correspond to the printing type (supply source) 14a1. The printing type (supply source) 14a1 is the type corresponding to the supply source of the image data in the same manner as the printing type (supply source) 13b4 described above. In this embodiment, the guarantee setting 14a2 is allowed to correspond to each of the six types of the printing types described above (COPY, FAX, MEDIA_PRINT, PC_PRINT/USE, PC_PRINT/LAN, MOBILE_PRINT).

The guarantee setting 14a2 is an area which stores the value to indicate whether or not the setting is such setting that the image data after the printing is stored as the guarantee data in the printing memory 13a. In an example shown in FIG. 2B, the case, in which "enabled" is stated as the guarantee setting 14a2, indicates the setting in which the image data is stored as the guarantee data in the printing memory 13a after the printing. On the other hand, the case, in which "disabled" is stated as the guarantee setting 14a2, indicates the setting in which the image data is deleted without storing the image data as the guarantee data in the printing memory 13a after the printing.

In other words, the guarantee object table 14a is a table which prescribes the condition of the printing type under which the image data is allowed to remain as the guarantee data in the printing memory 13a after the printing. In the example shown in FIG. 2B, the guarantee setting 14a2 is set for each of the six types of the printing types (supply sources). However, each of the guarantee settings 14a2 can be changed in accordance with an appropriate operation performed by the user, if necessary. For example, in the example shown in FIG. 2B, the guarantee setting 14a2 is set to the "disabled" setting when the printing type (supply source) 14a1 is "COPY". However, this setting can be changed to the "enabled" setting by the user, if necessary. In the example shown in FIG. 2B, the guarantee setting 14a2 is set to the "enabled" setting for the printing type (FAX) in which the original image is present at only the transmission source of the image data or the printing type (PC_PRINT/LAN) in which the user supplies the image data from a place disposed relatively far or remote from the MFP 1.

The printing type (supply source) 14a1 can be also increased, decreased, or changed in accordance with an appropriate operation performed by the user, if necessary, in the same manner as in the guarantee setting 14a2. For example, in FIG. 2B, all pieces of the image data, which are received via the LAN line connected to LAN_I/F 22, are designated as "PC_PRINT/LAN" without distinguishing individual PC's. However, in order that individual PC's (for example, different users) can be distinguished from each other, "PC_PRINT/LAN" may be subdivided into a plurality of subdivisions (for example, "PC_PRINT/LAN (USER1)" and "PC_PRINT/LAN (USER2)". In relation to another example, in FIG. 2B, all pieces of the image data, which are received from the external apparatuses by means of the facsimile function, are designated as "FAX" without distinguishing the external apparatuses (i.e., the other parties). However, "FAX" may be subdivided into a plurality of subdivisions (for example, "FAX (USER1)" and "FAX (USER2)" depending on the difference in the other party.

Figure 3A:
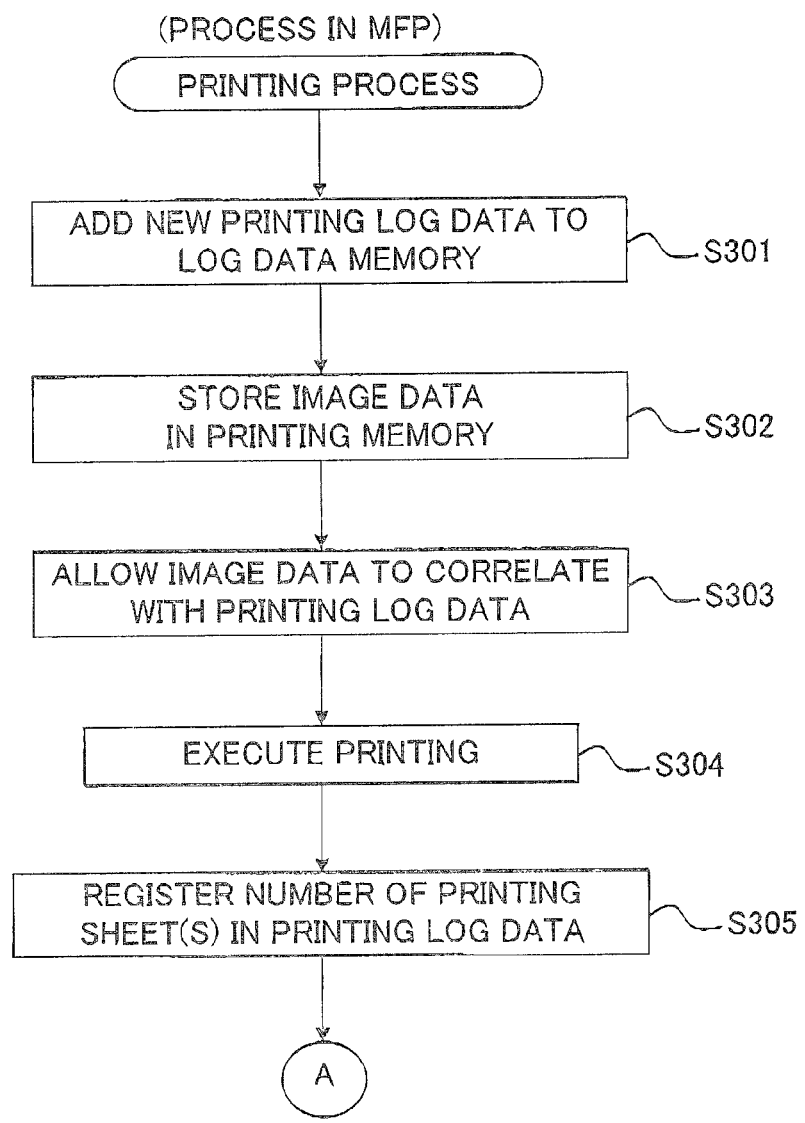
FIGS. 3A and 3B show flow charts illustrating a printing process.
Figure 3B:
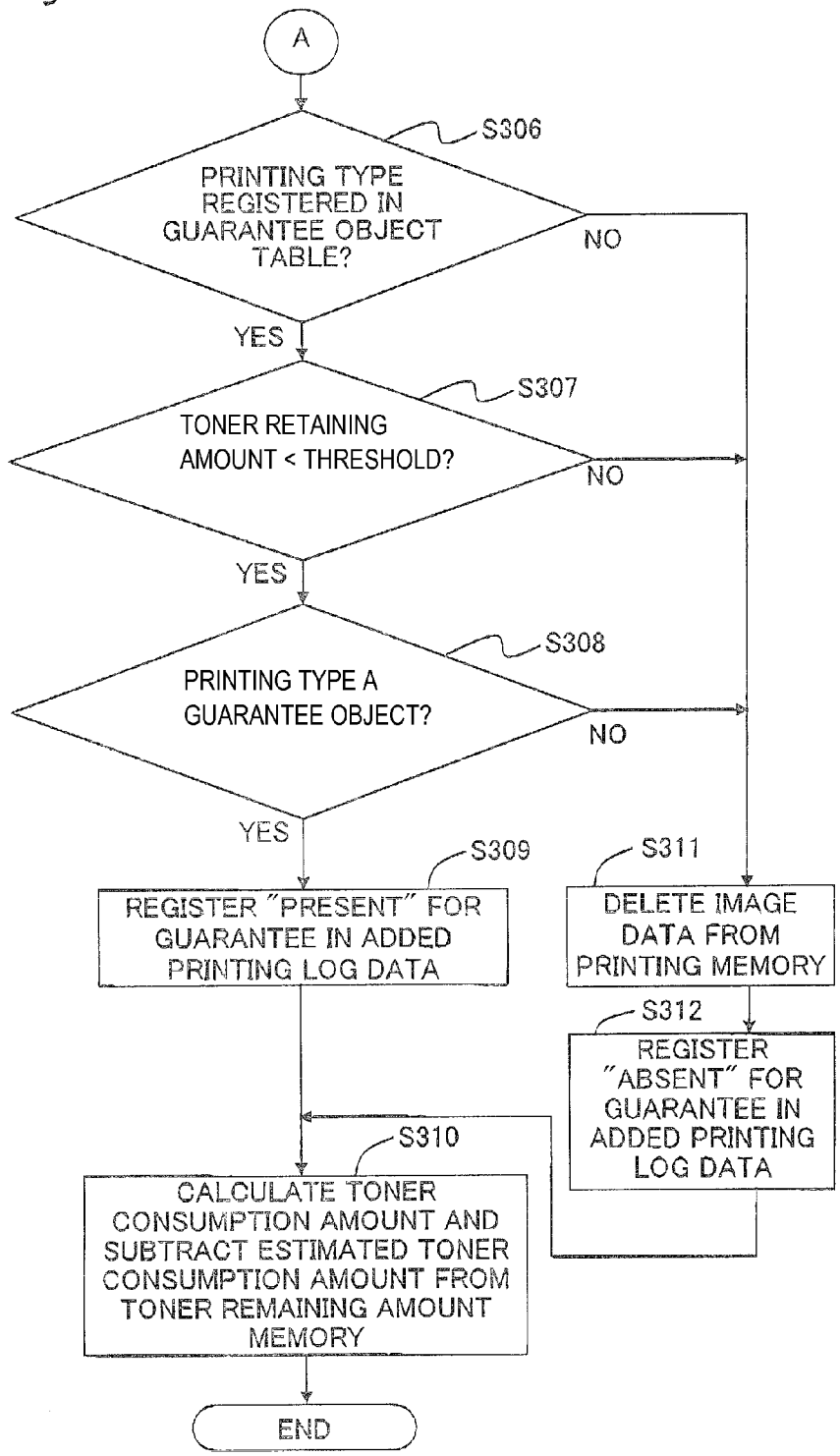

The printing process shown in FIG. 3 is started-up when the MFP 1 receives the supply of the image data based on one time of the printing instruction from the predetermined supply source via the scanner section 17 (COPY), the NCU 19 (FAX), the USB_I/F 21 (PC_PRINT/USB), the LAN_I/F 22 (PC_PRINT/LAN), the media slot 23 (MEDIA_PRINT), or the infrared ray data receiving section 24 (MOBILE_PRINT).

In the printing process, the CPU 11 firstly adds the new printing log data to the log data memory 13b (S301). In this procedure, the content of the printing type (supply source) 13b4, which is included in the added printing log data, is set as the value corresponding to the printing type (i.e., the supply source of the image data). Subsequently, the CPU 11 adds and stores the supplied image data in the printing memory 13a in a predetermined file format (for example, file in the tif format) (S302). In this procedure, the CPU 11 automatically gives the file name to each of the image data, and the CPU 11 makes the printing memory 13a store the image data. The file name, which is automatically given, is, for example, a character string to represents the printing date and time. Subsequently, the CPU 11 allows the added image data to correlate with the new printing log data added to the log data memory 13b in the step S301 (S303). Accordingly, the contents of the image data 13b1 are set in the new printing log data. Subsequently, the CPU 11 allows the printer section 19 to execute the printing on the basis of the image data (S304). The CPU 11 registers the number of printing sheet(s) (i.e., the number of recording paper sheet(s) subjected to the printing) in the number of printing sheet(s) 13b2 in the printing log data added in the step S301 (S305).

After the process in the step S305, the CPU 11 judges whether or not the printing type, which indicates the supply source of the image data, is the printing type registered in the guarantee object table 14a1 (S306). This judgment is performed on the basis of the guarantee object table 14a1. Specifically, if the printing type of the present printing (i.e., the supply source of the image data) is registered as the printing type (supply source) 14a1 in the guarantee object table 14a1, the CPU 11 affirms the judgment provided in the step S306. On the other hand, if the printing type of the present printing is not registered as the printing type (supply source) 14a1, the CPU 11 negates the judgment provided in the step S306.

If the judgment provided in the step S306 is affirmed (S306: Yes), the CPU 11 judges whether or not the period is the guarantee period for the toner remaining amount (S307). This judgment is performed on the basis of the toner remaining amount stored in the toner remaining amount memory 13f. Specifically, if the toner remaining amount, which is stored in the toner remaining amount memory 13f, is not more than a predetermined threshold value, the CPU 11 affirms the judgment provided in the step S307. On the other hand, if the toner remaining amount exceeds the threshold value, the CPU 11 negates the judgment provided in the step S307.

If the judgment provided in the step S307 is affirmed (S307: Yes), the CPU 11 judges whether or not the printing type, which indicates the supply source of the image data, is included in the guarantee object (S308). This judgment is performed on the basis of the guarantee object table 14a1. Specifically, if the value of the guarantee setting 14a2, which corresponds to the printing type (supply source) 14a1 to indicate the printing type of the present printing, indicates "enabled" in the guarantee object table 14a1, the CPU 11 affirms the judgment provided in the step S308. On the other hand, if the value of the guarantee setting 14a2 indicates "disabled", the CPU 11 negates the judgment provided in the step S308.

If the judgment provided in the step S308 is affirmed (S308: Yes), the CPU 11 registers "present" in the guarantee registration 13b3 in the printing log data added in the step S301 (S309). Subsequently, the consumption amount of the toner, which is to be consumed by the printing in the step S304, is calculated in accordance with a well-known method on the basis of the image data. The toner consumption amount, which is estimated by the calculation, is subtracted from the toner remaining amount memory 13f (S310). The printing process comes to an end.

On the other hand, if any one of the judgments provided in the steps S306 to S308 is negated (S306: No. S307: No. S308: No), then the CPU 11 deletes the image data used in the present printing from the printing memory 13a (S311), and the CPU 11 registers "absent" in the guarantee registration 13b3 in the printing log data added in the step S301 (S312). The printing process comes to an end.

According to the printing process as described above, only the image data of the printing type (supply source) 14a1, which is set as "enabled" in the guarantee setting 14a2 of the guarantee object table 14a1, is allowed to remain (stored) as the guarantee data in the printing memory 13a. Therefore, the guarantee data is stored only when the data of the predetermined printing type based on the supply source of the image data is designated. Therefore, it is possible to suppress the memory consumption amount of the RAM 13 required to store the guarantee data. Further, if the toner remaining amount exceeds the predetermined threshold value, the guarantee data is not stored. In other words, the guarantee data is stored only when the remaining amount is small and there is a high possibility of failure in the printing. Therefore, also from this viewpoint, it is possible to suppress the memory consumption amount of the RAM 13 required to store the guarantee data.

Figure 4A:
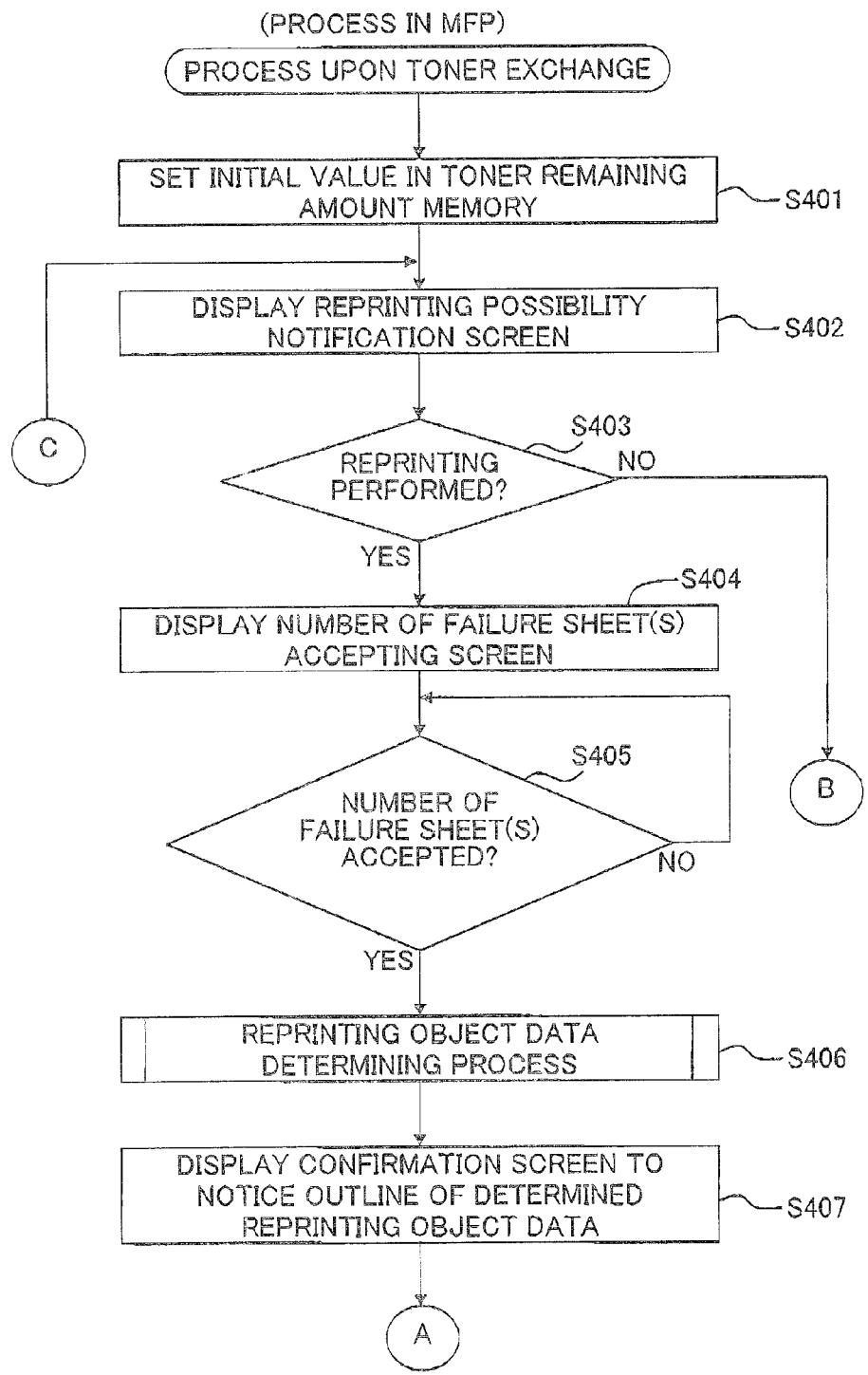
FIGS. 4A and 4B show flow charts illustrating a process upon the toner exchange.
Figure 4B:
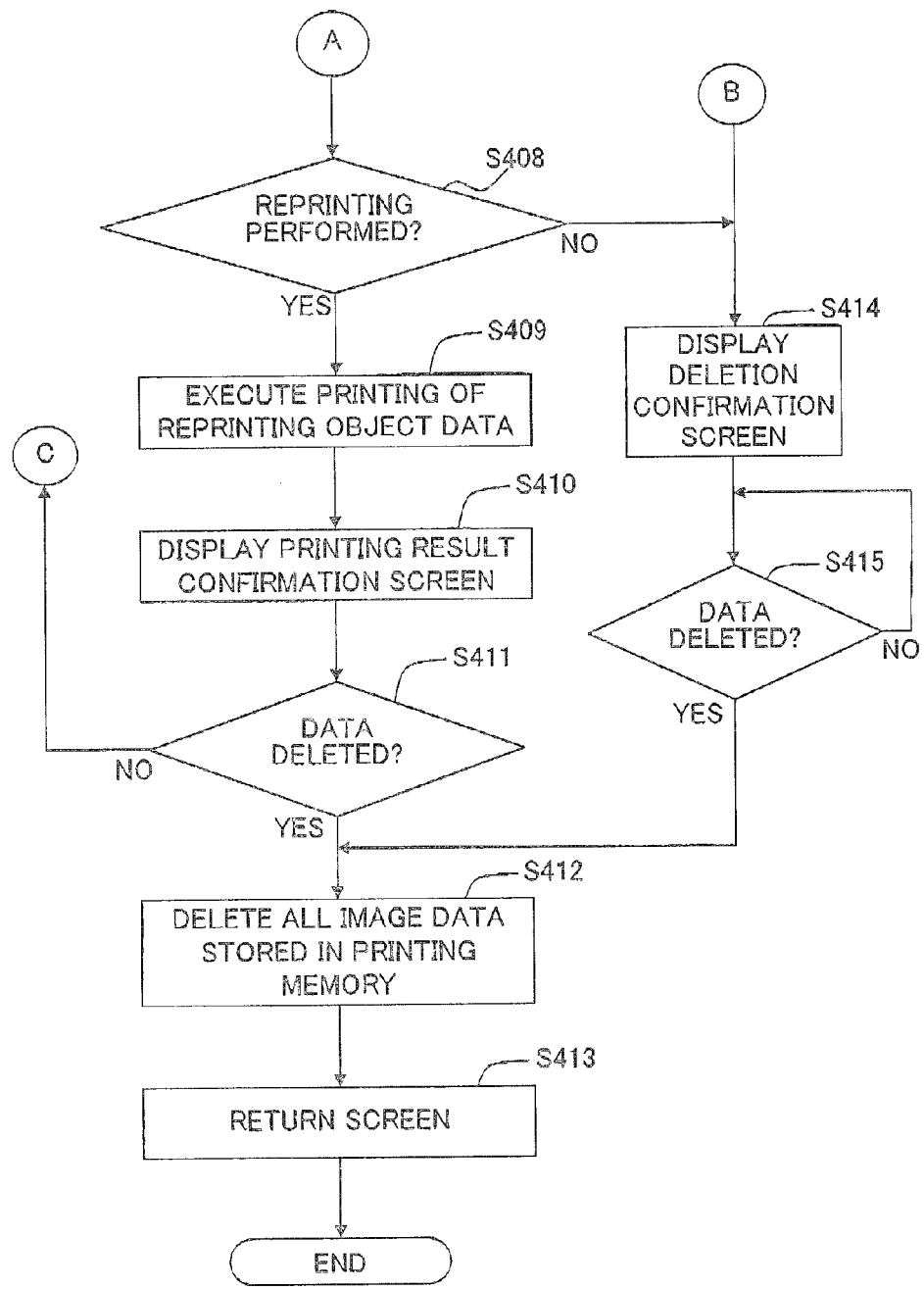

The process upon the toner exchange shown in FIG. 4 is started-up when the toner cartridge is removed from the printer section 18 in the MFP 1 and a new toner cartridge is installed. The CPU 11 firstly sets a value prescribed beforehand for the unused toner cartridge as the initial value in the toner remaining amount memory 13f (S401). Subsequently, the CPU 11 displays, on the LCD 16, a reprinting possibility (allowance) notification screen 601 (see FIG. 6A) (S402).

After the process in the step S402, the CPU 11 judges whether or not the instruction of reprinting is accepted from the reprinting possibility notification screen 601 (S403). If this judgment is affirmed (S403: Yes), a number of failure (unsuccessful) sheet(s) accepting screen 602 (see FIG. 6B) is displayed on LCD 16 (S404). Subsequently, the CPU 11 judges whether or not the number of failure (unsuccessful) sheet(s) is accepted from the number of failure sheet(s) accepting screen 602 (S405). If this judgment is negated (S405: No), then the CPU 11 returns the process to the step S405, and the CPU 11 waits until the number of failure sheet(s) is inputted by the user and the input is accepted. On the other hand, if the judgment provided in the step S405 is affirmed (S405: Yes), the CPU 11 executes the reprinting object data determining process in which the image data as the object of the reprinting is determined and extracted from the data stored as the guarantee data in the printing memory 13a on the basis of the accepted number of failure sheet(s) (S406). Details of the reprinting object data determining process (S406) will be described later on with reference to FIGS. 5A and 5B.

Subsequently, the CPU 11 displays, on the LCD 16, a confirmation screen 603 to notice the outline of the image data as the object of the reprinting determined by the process in the step S406 (see FIG. 6C) (S407). The CPU 11 judges whether or not the reprinting instruction is accepted from the confirmation screen 603 (S408). If this judgment is affirmed (S408: Yes), the CPU 11 allows the printer section 19 to execute the printing based on the image data determined as the object of the reprinting (S409). Subsequently, the CPU 11 displays, on the LCD 16, a printing result confirmation screen 604 (see FIG. 6D).

After the process in the step S410, the CPU 11 judges whether or not the instruction to delete the image data (i.e., the guarantee data) stored in the printing memory 13a is accepted from the printing result confirmation screen 604 (S411). If this judgment is affirmed, the CPU 11 deletes all of the image data stored as the guarantee data in the printing memory 13a (S412). In this procedure, the CPU 11 rewrites the value of the guarantee registration 13b3 of the log data corresponding to the image data as the deletion object, of the log data stored in the log data memory 13b to the value which indicates "absent". In another arrangement, the log data stored in the log data memory 13b may be erased. Subsequently, the CPU 11 returns the screen having been displayed on the LCD 16 to the original (S413), and the process upon the toner exchange comes to an end. On the other hand, if the judgment provided in the step S411 is negated (S411: No), this situation resides in such a case that the instruction to perform the reprinting is accepted from the printing result confirmation screen 604. Therefore, in such a case, the CPU 11 returns the process to the step S402.

If the judgment provided in the step S403 is negated (S403: No), or if the judgment provided in the process in the step S408 is negated (S408: No), then the CPU 11 displays, on the LCD 16, a deletion confirmation screen (not shown) which is the screen to confirm whether or not the guarantee data stored in the printing memory 13a is deleted (S414). Subsequently, the CPU 11 judges whether or not the instruction of deletion is accepted from the deletion confirmation screen (S415). If this judgment is negated (S415: No), then the CPU 11 returns the process to the step S415, and the CPU 11 waits until the instruction of deletion is accepted. If the judgment provided in the step S415 is affirmed (S415: Yes), the CPU 11 allow the process to proceed to the step S412.

FIG. 5 shows a flow chart illustrating the reprinting object data determining process (S406) described above. In the reprinting object data determining process, the CPU 11 firstly sets the number of failure sheet(s) accepted in the step S405 for the variable "n" which indicates the number of sheet(s) to be processed (S501). Subsequently, the CPU 11 sets "1" as the initial value for the variable "m" which indicates the number of task(s) to be processed (S502). The CPU 11 clears the stack memory 13d (S503), and the CPU 11 clears (zero-clears) the stack number counter 13e (S504).

Subsequently, the CPU 11 refers to the m-th log data as counted from the latest or newest log data ("m" is a variable to indicate the number of task(s) to be processed) of the log data (printing log data) stored in the log data memory 13b. The value of the number of printing sheet(s) 13b2 in the log data is set to the variable "k" which indicates the number of printing sheet(s) (S505).

After the process in the step S505, the CPU 11 judges whether or not the m-th image data is present in the printing memory 13a (S506). This judgment is performed on the basis of the contents of the guarantee registration 13b3 of the log data referred to in the step S505. Specifically, if the value of the guarantee registration 13b3 indicates "present", the CPU 11 affirms the judgment provided in the step S506. On the other hand, if the value the guarantee registration 13b3 indicates "absent", the CPU 11 negates the judgment provided in the step S506. Alternatively, the search may be performed about whether or not the image data, which has the file name stored in the image data 13b1 of the log data referred to in the step S505, is present in the printing memory 13a. If the image data is present, the judgment may be affirmed or affirmative. If the image data is absent, the judgment may be negated or negative.

If the judgment provided in the step S506 is negated (S506: No), the CPU 11 allows the process to proceed to the step S510. On the other hand, if the judgment provided in the step S506 is affirmed (S506: Yes), the CPU 11 judges whether or not the variable "k" is not more than the variable "n", i.e., whether or not the m-th number of printing sheet(s) k is included in the "n" sheet(s) set as the number of failure sheet(s) (S507). If the judgment provided in the step S507 is affirmed, i.e., if the m-th number of printing sheet(s) "k" is included in the "n" sheet(s) set as the number of failure sheet(s), then the CPU 11 pushes the image data corresponding to the m-th log data from the printing memory 13a to the stack memory 13d (S508), and the CPU 11 allows the process to proceed to the step S509.

On the other hand, if the judgment provided in the step S507 is negated, i.e., if any part of the m-th number of printing sheet(s) "k" is not included in the "n" sheet(s) set as the number of failure sheet(s) (S507: No), then the CPU 11 pushes the data corresponding to "n" page(s) from the end of the image data corresponding to the m-th log data from the printing memory 13a to the stack memory 13d (S512), and the CPU 11 allows the process to proceed to the step S509.

The CPU 11 adds, to the stack number counter 13e, the value corresponding to the number of page(s) of the image data added to the stack memory 13d in accordance with the process of the step S508 or S512, in the step S509 (S509). Subsequently, the CPU 11 sets the value of the variable "n" to "n−k" (S510) to judge whether or not "n" is not less than 1 (S511). If the judgment provided in the step S511 is affirmed (S511: Yes), the number does not arrive at the number of failure sheet(s) inputted by the user. Therefore, the CPU 11 sets the value of the variable "m" to "m+1" (S513), and the CPU 11 allows the process to return to the step S505.

The reprinting object data determining process described above will now be explained by using the example shown in FIG. 2A. If a number of failure sheets of "10" is inputted with respect to the log data stored in the log data memory 13b shown in FIG. 2A, the image data, which is the object of the reprinting, is determined in an order starting from the image data which is new as the log data (i.e., in an order of log data R1→log data R2→log data R3→log data R4). The number of printing sheets 13b2 of the newest log data R1 is 3 pages. However, the guarantee registration 13b3 is "absent", and the guarantee data is absent in the printing memory 13a. Therefore, the image data of the log data R1 is not the object of the reprinting. Subsequently, as for the log data R2, the guarantee registration 13b3 is "present". Therefore, the image data, in which the number of printing sheets 13b2 is 2 pages, is the object of the reprinting. As for the log data R3, the guarantee registration 13b3 is "absent". Therefore, the image data, in which the number of printing sheets 13b2 is 3 pages, is not the object of the reprinting. Subsequently, as for the log data R4, the guarantee registration 13b3 is "present". Therefore, the image data may be the object of the reprinting. However, only the 2 sheets remain until arrival at the 10 sheets inputted as the number of failure sheets. Therefore, only the 2 sheets thereof are the object of the reprinting, although the number of printing sheets 13b2 of the image data of the log data R4 is 5 sheets. In this case, the pages, which are new in a chronological order, i.e., the 2 pages from the end are the object of the reprinting.

Therefore, according to the reprinting object data determining process, the user can extract the guarantee data included in the range of the number of failure sheet(s) as the object of the reprinting by merely inputting the number of failure sheet(s) without considering the printing type (i.e., whether or not the printing type is the type for which the printing guarantee is provided). Therefore, the user can perform the reprinting by extracting only the image data unsuccessful in the printing from the image data stored as the guarantee data, provided that only the number of the recording paper sheet(s) unsuccessful in the printing is counted beforehand, of the recording paper sheet(s) actually subjected to the printing.

Figure 6A:
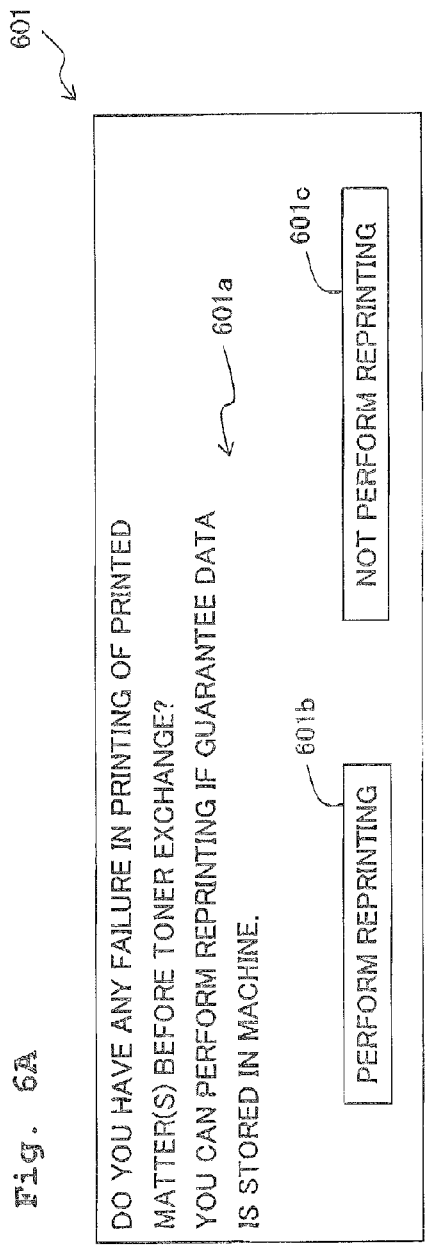
FIGS. 6A to 6D schematically show examples of respective screens displayed on LCD during the course of execution of the process upon the toner exchange.

As shown in FIG. 6A, the reprinting possibility notification screen 601 is the screen which is displayed on the LCD 16 in the step S402 in the process upon the toner exchange described above (see FIG. 4). A message 601a, which informs that the reprinting can be performed if the guarantee data is stored, is displayed on the reprinting possibility notification screen 601. Further, a button 601b to indicate "Perform reprinting" and a button 601c to indicate "Not perform reprinting" are displayed thereon.

If the user touches the button 601b in the state in which the screen 601 is displayed, then the CPU 11 accepts the instruction of reprinting, and the CPU 11 allows the process to proceed to the step S404. On the other hand, if the user touches the button 601c, then the CPU 11 accepts the instruction not to perform the reprinting, and the CPU 11 allows the process to proceed to the step S414.

Figure 6B:
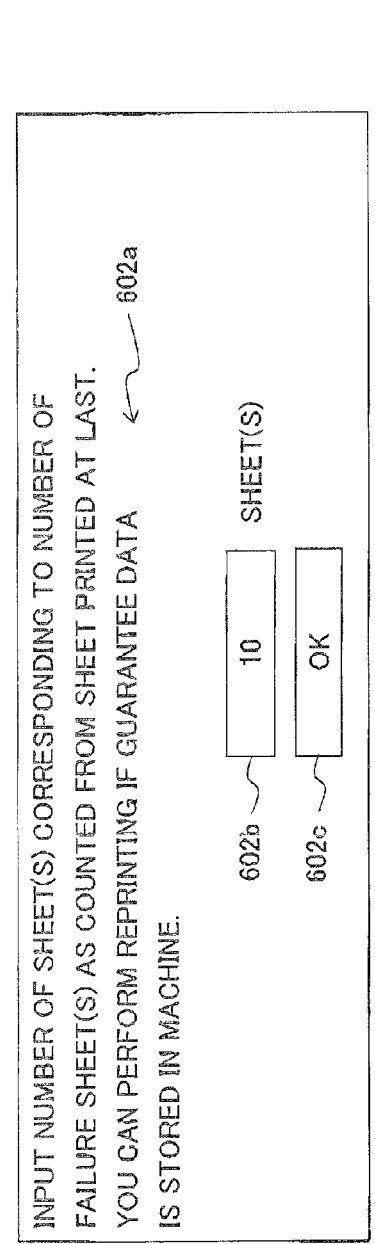

As shown in FIG. 6B, the number of failure sheet(s) accepting screen 602 is the screen which is displayed on the LCD 16 in the step S404 in the process upon the toner exchange described above. Those displayed on the number of failure sheet(s) accepting screen 602 are a message 602a which informs that the input of the number of failure sheet(s) (number of sheet(s) subjected to any insufficient printing) is prompted, an input box 602b which is provided to input the number of failure sheet(s), and a button 602c which is indicated as "OK" to instruct the completion of the input.

If the user touches the button 602c after the user inputs the number of failure sheet(s) into the inside of the input box 602b in the state in which the screen 602 is displayed, then the CPU 11 accepts the input of the number of failure sheet(s), and the CPU 11 allows the process to proceed to the step S406.

Figure 6C:
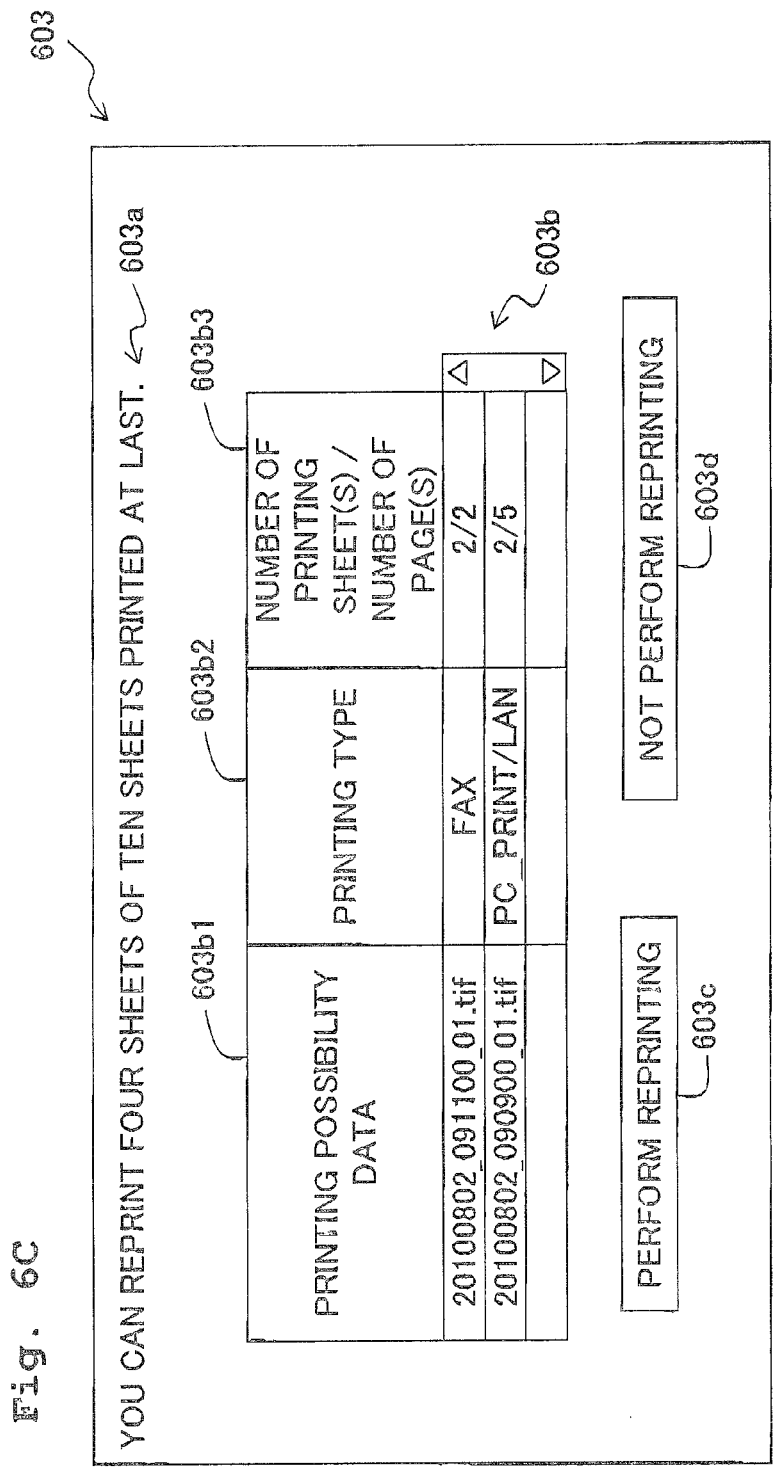

As shown in FIG. 6C, the confirmation screen 603 is the screen which is displayed on the LCD 16 in the step S407 in the process upon the toner exchange described above. A message 603a of "You can reprint Y sheet(s) of X sheet(s) printed at last," is displayed on the confirmation screen 603. The value of the number of failure sheet(s), which is inputted from the number of failure sheet(s) accepting screen 602 by the user, is displayed on "X" of the message 603a. The value of the number of printing sheet(s), which is based on the image data as the object of the reprinting determined in the reprinting object data determining process (S406), is displayed on "Y". In the example shown in FIG. 6C, "X" is "10", and "Y" is "4". In this way, the number of failure sheet(s) inputted by the user and the number of printing sheet(s) subjected to the reprinting are displayed. Therefore, the user can easily grasp the extent of the number of the printing sheet(s) which is based on the printing type desired to be guaranteed and which is included in the number of failure (unsuccessful) printing sheet(s).

A column 603b to display the outline of the image data as the object of the reprinting is displayed on the confirmation screen 603. Those displayed on the outline display column 603b are sets or combinations each of which is composed of the printing possibility (allowance) data 603b1, the printing type 603b2, and the number of printing sheet(s)/number of page(s) 603b3 for each one of the pieces of image data as the object of the reprinting. In the example shown in FIG. 6C, the two pieces of data D1, D2, which are the object of the reprinting, are displayed on the outline display column 603b.

The content of the image data 13b1, which resides in the corresponding image data in the log data memory 13b and which is the file name in the printing memory 13a of the image data determined as the object of the reprinting, is displayed on the printing possibility data 603a1. The file name is often a character string represented, for example, by the printing date and time. Therefore, the file name, which is displayed on the printing possibility data 603a1, can be used by the user as an index to know the content of the image data. When the character string, which represents the printing date and time, is displayed as the file name displayed on the printing possibility data 603a1, it is possible to use the character string as an index to know the chronological order or the time series of the order in which the printing is instructed.

In the example shown in FIG. 6C, as for the two pieces of data D1, D2 displayed on the outline display column 603b, the file name, which is displayed on the printing possibility data 603a1 of the data D2, is "20100802_090900_01.tif". When the portion of "090900", which indicates the printing time, is compared with the same portion "091100" of the file name displayed on the printing possibility data 603a1 of the data D1, it is appreciated that the printing time of the data D2 is earlier than that of the data D1, i.e., the data D2 is the image data which is older than the data D1 in the chronological order or the time series.

The content of the printing type (supply source) 13b4 of the corresponding image data in the log data memory 13b as the printing type of the image data determined as the object of the reprinting is displayed on the printing type 603b2. The printing type, which is displayed on the printing type 603b2, can be used by the user as an index to know the content of the concerning image data.

The numerical values are displayed in a form of "B/A" on the number of printing sheet(s)/number of page(s) 603b3. The total number of printing sheet(s) (total number of page(s)), which relates to the image data of the file name displayed on the printing possibility data 603a1, is displayed on "A". The number of printing sheet(s) subjected to the reprinting is displayed on "B" under such a condition that the number is within a range of the number of failure sheet(s) inputted by the user. In the example shown in FIG. 6C, as for the two pieces of data D1, D2 displayed on the outline display column 603b, the number of printing sheet(s)/number of page(s) 603b of the data D1 is "2/2", while the number of printing sheet(s)/number of page(s) 603b of the data D2 is "2/5". In other words, it is indicated that the guarantee data of the data D2 is stored in the printing memory 13a, but those included in the range of the number of failure sheet(s) are 2 pages from the end thereof.

Those also displayed on the confirmation screen 603 are a button 603c in which "Perform reprinting" is displayed and a button 603d in which "Not perform reprinting" is displayed. When the user touches the button 603d in the state in which the screen 603 is displayed, then the CPU 11 accepts the instruction of reprinting, and the CPU 11 allows the process to proceed to the step S409. As a result, all of the pages (2 pages) of the data D1 and the 2 pages of the data D2, which are displayed on the outline display column 603, are reprinted. On the other hand, if the user touches the button 603d, then the CPU 11 accepts the instruction not to perform the reprinting, and the CPU 11 allows the process to proceed to the step S414.

Figure 6D:
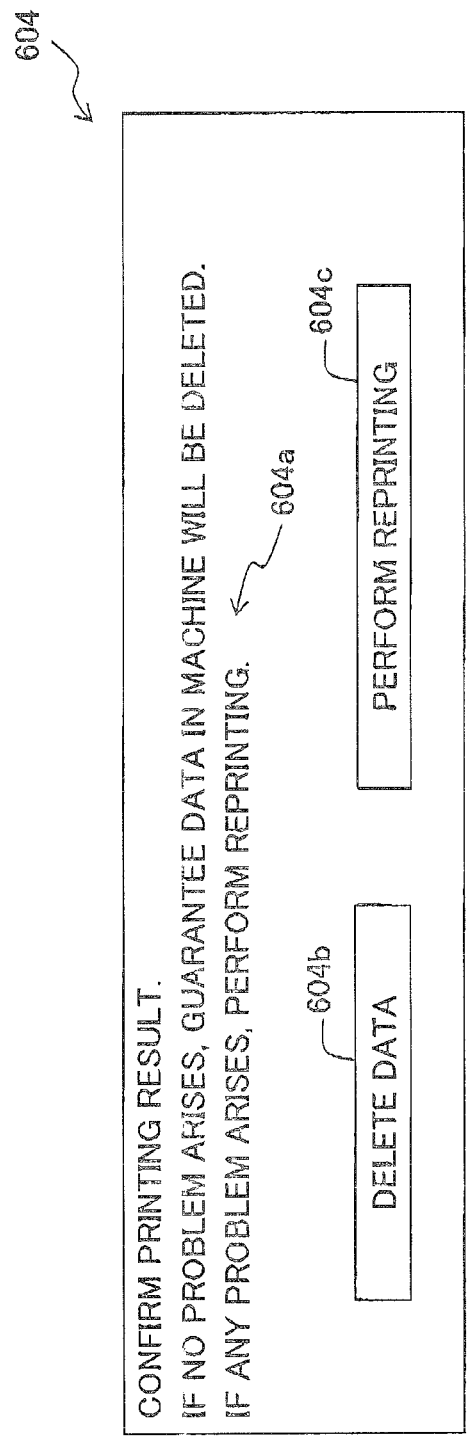

As shown in FIG. 6D, the printing result confirmation screen 604 is the screen which is displayed on the LCD 16 in the step S410 in the process upon the toner exchange described above. A message 604a, which informs that the result of the reprinting should be confirmed and the guarantee data will be deleted if no problem arises, is displayed on the printing result confirmation screen 604. Further, a button 604b to display "Delete data" and a button 604c to display "Perform reprinting" are displayed on the printing result confirmation screen 604.

If the user touches the button 604b in the state in which the screen 604 is displayed, then the CPU 11 accepts the instruction of deletion, and the CPU 11 allows the process to proceed to the step S412. On the other hand, if the user touches the button 604c, then the CPU 11 accepts the instruction to perform the reprinting, and the CPU 11 allows the process to proceed to the step S402.

As explained above, according to the MFP 1 of this embodiment, the guarantee data is stored while being limited to the data of the predetermined printing type based on the supply source of the image data. Therefore, it is possible to suppress the memory consumption amount of the RAM 13 required to store the guarantee data. Further, it is possible to use the RAM 13 having a small capacity. Therefore, it is also possible to contribute to the reduction of the production cost. Further, only the image data of the specified printing type is allowed to remain as the guarantee data. Therefore, the period of time, which is required for the reprinting, can be also suppressed to be the short period of time, as compared with a case in which all of the image data is allowed to remain as the guarantee data.

In the MFP 1 of this embodiment, the toner remaining amount is estimated on the basis of the consumption amount of the toner. Therefore, it is unnecessary to provide any sensor in order to detect the toner remaining amount, and it is possible to suppress the production cost. On the other hand, the accuracy of the estimated toner remaining amount is relatively low. Therefore, it is necessary that the threshold value, which is provided to judge whether or not the period is the guarantee period (period in which the guarantee data is allowed to remain), should be set to be relatively high. Therefore, the data, which is stored after the toner remaining amount arrives at a value of not more than the threshold value, is also increased corresponding thereto. However, in the MFP 1 of this embodiment, only the image data of the specified printing type is allowed to remain as the guarantee data.

Therefore, it is possible to avoid the memory full of the RAM 13 which would be otherwise caused by the accumulation of the guarantee data.

The present invention has been explained above on the basis of the embodiment. However, the present invention is not limited to the embodiment described above. It is possible to easily presume that various improvements and modifications can be made within a range without deviating from the gist or essential characteristics of the present teaching.

For example, in the embodiment described above, the MFP 1 is exemplified as the image forming apparatus by way of example. However, the present teaching is applicable to any apparatus for performing the image formation (printing) on the recording paper, including, for example, a mono-function printer apparatus and a mono-function facsimile apparatus.

The embodiment described above is constructed as the laser printer in which the printer section 18 uses the toner. However, the printer section 18 may be constructed as an ink-jet printer which uses an ink as a coloring agent that is an expendable material.

In the embodiment described above, the printer section 18 is the monochrome or black and white printer. However, the printer section 18 may be a color printer. In the cage of the color printer, the color printer may be constructed such that the guarantee data is allowed to remain in the printing memory 13a when the remaining amount of the coloring agent of at least one color is not more than a predetermined threshold value, and the reprinting based on the guarantee data can be performed when the coloring agent of a certain color is exchanged.

The embodiment described above is constructed such that the reprinting is guaranteed for the failure or unsuccessful printing when the toner as the expendable material is exchanged. However, it is also allowable to construct an ink-jet printer such that the reprinting is guaranteed for the clog-up of the head nozzles. Another arrangement is also available such that the processes of the steps S402 to S415, which are included in the process upon the toner exchange (see FIG. 4), are executed, for example, when the cleaning is performed for the head.

The embodiment described above is constructed such that the user counts the number of failure sheet(s) to be inputted. However, another arrangement is also available such that an automatic document feeder (ADF) is provided for the MFP 1, and the recording paper sheet(s), on which the printing was unsuccessful, is/are set to ADF so that the number is automatically counted and inputted.

In the embodiment described above, the image data, which is the object of the reprinting, is stored in the stack memory 13d in the reprinting object data determining process (see FIG. 5). However, in this situation, the same data temporarily exists in the printing memory 13a and the stack memory 13d, wherein the efficiency of use of the memory is unsatisfactory. Therefore, the following arrangement is also available. That is, the information, which specifies the image data as the reprinting object on the printing memory 13a, is stored in the stack memory 13d. When the reprinting is executed in the step S409, the CPU 11 supplies the printing data as the object of the reprinting from the printing memory 13a to the printer section 19 on the basis of the information stored in the stack memory 13a to perform the printing. The information, which specifies the printing data as the reprinting object, is, for example, the size and the start address of the printing data, provided that the information depends on the method for managing the printing memory 13a. Alternatively, ID of the file and the page number may be the information to specify the printing data as the reprinting object. When the arrangement as described above is adopted, it is possible to further suppress the consumption amount of the memory (the RAM 13).

The embodiment described above is constructed such that the image data, which is supplied from the supply source, is stored as the guarantee data in the printing memory 13a. However, the printing data, which is converted from the image data, may be stored as the guarantee data. In another arrangement, when the printing data is supplied from the supply source, the supplied printing data may be stored as the guarantee data.

The embodiment described above is constructed such that the toner remaining amount is calculated by estimating the toner consumption amount without using any sensor. However, another arrangement is also available such that a sensor, which can detect the toner remaining amount, is installed.

The embodiment described above is constructed such that the image data, which is displayed on the outline display column 603b, is subjected to the reprinting on the determined number of sheet(s) when the button 603c of the confirmation screen 603 is operated. However, another arrangement is also available such that the image data, which is subjected to the reprinting, is finally selected by the user.

In the embodiment described above, the USB_I/F 21 is exemplified as one to which PC is connected by way of example. However, any USB device, which is, for example, a USB memory or a digital camera, may be connected to the USB_I/F 21. In this case, the type of the connectable USB device can be also classified as the printing type.

What is claimed is:

1. An image forming apparatus configured to form an image on a recording medium based on a received printing instruction in one of a printing process and a reprinting process, the image formation performed on the recording medium by using an expendable material, the image forming apparatus comprising:

a data memory configured to store an image data that is designated for printing in response to a printing instruction being received;

a reprinting condition memory configured to store printing functions and types of the printing functions, the printing functions including at least two of a facsimile function, a copy function and a printer function, the reprinting condition memory being further configured to correlate the printing function with the types of the printing functions by each of the printing functions being identified as one of a first type of printing function that is guaranteed to be printed and a second type of printing function that is not guaranteed to be printed; and a processor comprising hardware configured to:

execute a printing process or a reprinting process for performing image formation on the recording medium in response to a printing instruction being received;

determine whether or not a remaining amount of the expendable material, which is calculated by estimating an amount of use of the expendable material consumed by the image formation each time when the image formation on the recording medium is executed by using the expendable material, does not exceed a predetermined threshold value, the predetermined threshold value being set to a near-empty value;

determine whether or not the printing function designated by the printing instruction is correlated with the first or second type of the printing functions in the reprinting condition memory, wherein the processor deletes the image data which is used in the image formation from the data memory based on a condition that the processor determines that the printing function designated by the printing instruction is not correlated with both of the first and second type of the printing functions in the reprinting condition memory, determine that the image data used in the image formation is designated for image reprinting and retain the image data which is used in the image formation in the data memory based on a condition that the printing function designated by the printing instruction is correlated with the first type of the printing function in the reprinting condition memory and the processor determines that the remaining amount does not exceed the predetermined threshold value, determine that the image data used in the image formation is not designated for image reprinting and delete the image data which is used in the image formation from the data memory based on a condition that the printing function designated by the printing instruction is correlated with the first type of the printing function in the reprinting condition memory and the processor determines that the remaining amount exceeds the predetermined threshold value, determine that the image data used in the image formation is not designated for image reprinting and delete the image data which is used in the image formation from the data memory based on a condition that the printing function designated by the printing instruction is correlated with the second type of the printing function in the reprinting condition memory, execute a reprinting process to reprint the image data used in the image formation designated for image reprinting in response to an instruction for reprinting being received.

2. The image forming apparatus according to claim 1, further comprising:

a log data memory configured to store, as a log data, the image data which is used in the image formation and a number of the recording medium or media subjected to the image formation under a condition that the image formation is executed on the recording medium by the image forming mechanism;

the process further including:

a number-accepting mechanism configured to accept a number of the recording medium or media to perform the image reprinting;

a data extracting mechanism configured to extract the image data of the number of the recording medium or media accepted by the number-accepting mechanism in an order starting from one having a newer point in time at which the image formation has been performed, based on the log data stored in the log data memory; and an image reprinting mechanism configured to execute a reprinting process for performing image reprinting on the recording medium based on the image data extracted by the data extracting mechanism.

3. The image forming apparatus according to claim 2, wherein the data extracting mechanism includes a counting mechanism configured to count the number of the recording medium or media subjected to the image reprinting by means of the reprinting process performed by the image reprinting mechanism based on the extracted image data; and the processor further includes a reprinting number display mechanism which has a screen displaying the number of the recording medium or media accepted by the number accepting mechanism and the number of the recording medium or media counted by the counting mechanism under a condition that the number of the recording medium or media subjected to the image reprinting is accepted by the number accepting mechanism.

4. The image forming apparatus according to claim 2, wherein the image data and the type of the printing function, that is used when the printing instruction is provided for the image data, are stored with correlating with each other, in the log data stored in the log data memory; and the processor further includes a reprinting information display mechanism which has a screen displaying information to specify the image data extracted by the data extracting mechanism and the type of the printing function, that is used when the printing instruction is provided for the extracted image data as obtained based on the log data, with correlating the information to specify the image data with the type of the printing function, under a condition that the number of the recording medium or media subjected to the image reprinting is accepted by the number accepting mechanism.

5. The image forming apparatus according to claim 2, wherein the processor is configured to delete the image data as the source of the image formation from the data memory under a condition that it is determined by the processor that the remaining amount exceeds the predetermined threshold value.

6. The image forming apparatus according to claim 1, wherein the processor is configured to delete the image data which was retained, under a condition that an instruction for deleting the image data is received.

7. The image forming apparatus according to claim 1, wherein whether the printing function is included in the first type of printing function or is included in the second type of printing function is user-settable.

8. The image forming apparatus according to claim 1, wherein the processor further includes a data handling mechanism that deletes the image data which is used in the image formation from the data memory under a condition that reprinting process for the image data is performed and an instruction for deleting the image data is received.

9. An image forming apparatus configured to form an image on a recording medium based on a received printing instruction in one of a printing process and a reprinting process, the image formation performed on the recording medium by using an expendable material, the image forming apparatus comprising:

a data memory configured to store an image data that is designated for printing in response to a printing instruction being received;

a reprinting condition memory configured to store printing functions and types of the printing functions, the printer functions including:

a Media-Print function in which the image data is received from a storage media installed to the image forming apparatus;

a PC-Print/USB function in which the image data is received from a PC that is connected to the image forming apparatus via a USB connection;

a PC-Print/LAN function in which the image data is received from a PC that is connected to the image forming apparatus via a LAN connection; and a Mobile-Print function in which the image data is received from a portable terminal, wherein the facsimile function and the PC-Print/LAN function are identified as a first type of printing function that is guaranteed to be printed, and the copy function, the Media-Print function, the PC-Print/USB function, and the Mobile-Print function are identified as a second type of printing function that is not guaranteed to be printed; and a processor comprising hardware configured to:
  execute a printing process or a reprinting process for performing image formation on the recording medium in response to a printing instruction being received;
  determine whether or not a remaining amount of the expendable material, which is calculated by estimating an amount of use of the expendable material consumed by the image formation each time when the image formation on the recording medium is executed by using the expendable material, does not exceed a predetermined threshold value, the predetermined threshold value being set to a near-empty value;
  determine that the image data used in the image formation is designated for image reprinting and retain the image data which is used in the image formation in the data memory based on a condition that the printing function designated by the printing instruction is correlated with the first type of the printing functions in the reprinting condition memory and the processor determines that the remaining amount does not exceed the predetermined threshold value,
  determine that the image data used in the image formation is not designated for image reprinting and delete the image data which is used in the image formation from the data memory based on a condition that the printing function designated by the printing instruction is correlated with the first type of the printing functions in the reprinting condition memory and the processor determines that the remaining amount exceeds the predetermined threshold value,
  determine that the image data used in the image formation is not designated for image reprinting and delete the image data which is used in the image formation from the data memory based on a condition that the printing function designated by the printing instruction is correlated with the second type of the printing function in the reprinting condition memory,
  execute a reprinting process to reprint the image data used in the image formation designated for image reprinting in response to an instruction for reprinting being received.

* * * * *